Figure 1:
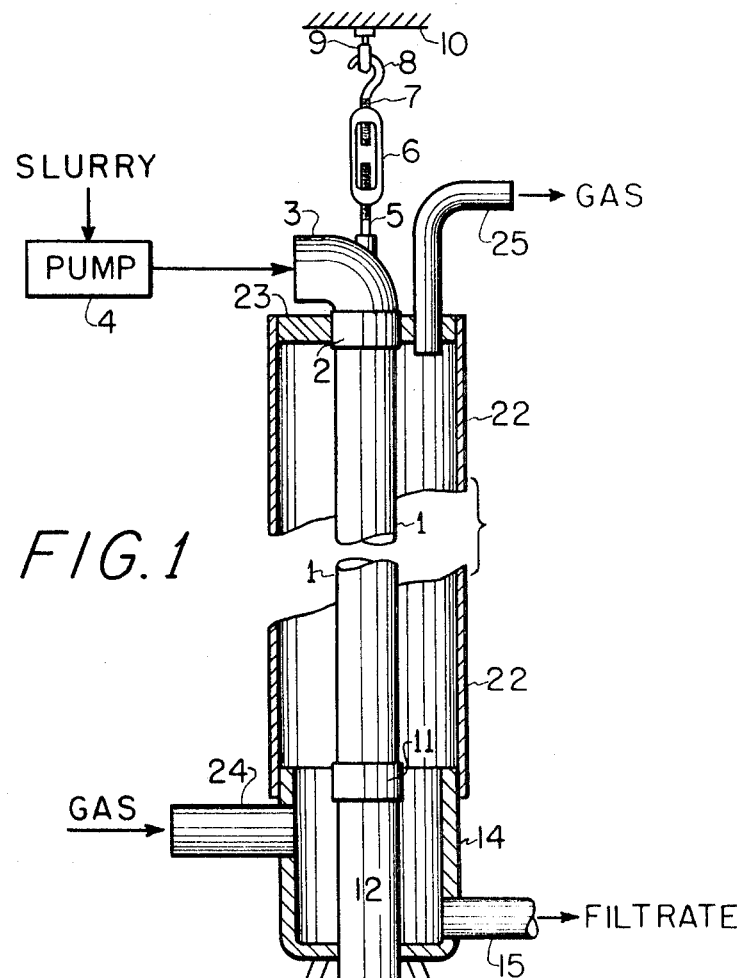

United States Patent

[11] 3,589,516

| [72] | Inventors | Wayne M. Camirand<br>Albany;<br>Karel Popper, Danville, both of, Calif. |
|---|---|---|
| [21] | Appl. No. | 52,161 |
| [22] | Filed | July 6, 1970 |
| [45] | Patented | June 29, 1971 |
| [73] | Assignee | The United States of America as represented by the Secretary of Agriculture<br>Continuation-in-part of application Ser. No. 766,696, Oct. 11, 1968, now Patent No. 3,523,077, dated Aug. 4, 1970. |

[54] UNIFLOW FILTER WITH GASIFYING MEANS
13 Claims, 2 Drawing Figs.

[52] U.S. Cl. .................................................. 210/70, 210/112, 210/218, 210/433

[51] Int. Cl. ....................................................B01d 23/04, B01d 29/14, B01d 37/04
[50] Field of Search .......................................... 210/70, 218, 220, 112, 433

[56] References Cited
UNITED STATES PATENTS

| 1,348,159 | 8/1920 | Down | 210/218 X |
| 3,389,795 | 6/1968 | Wintzer | 210/112 |
| 3,423,313 | 1/1969 | Messer | 210/433 X |

Primary Examiner—John Adee
Attorneys—R. Hoffman, W. Bier and W. Takacs

ABSTRACT: Apparatus which utilizes a vertically positioned, foraminous, flexible hose as a filter chamber and a surrounding cylindrical shroud of impervious flexible material which serves as a means for exposing the filtrate to a selected gas.

3,589,516

WAYNE M. CAMIRAND
& KAREL POPPER
INVENTORS

BY R. Hoffman & W. Takacs
ATTORNEYS

UNIFLOW FILTER WITH GASIFYING MEANS

This is a continuation-in-part of our copending application Ser. No. 766,696, filed Oct. 11, 1968, now U.S. Pat. No. 3,523,077 issued Aug. 4, 1970.

A nonexclusive, irrevocable, royalty-free license in the invention herein described, throughout the world for all purposes of the United States Government, with the power to grand sublicenses for such purposes, is hereby granted to the Government of the United States of America This invention relates to and has among its objects the provision of novel apparatus and process for conducting filtrations with concomitant gasification of the filtrate as it is produced. Further objects of the invention will be obvious from the following description and the annexed drawing.

In the drawing, wherein like numerals represent like parts:

FIG. 1 depicts, partly in cross section, a form of apparatus in accordance with the invention. To reduce the size of the figure, a portion of hose 1 and shroud 22 have been omitted. Certain of the parts, particularly shroud 22, are shown in exaggerated thickness for clarity of representation.

Figure 2:
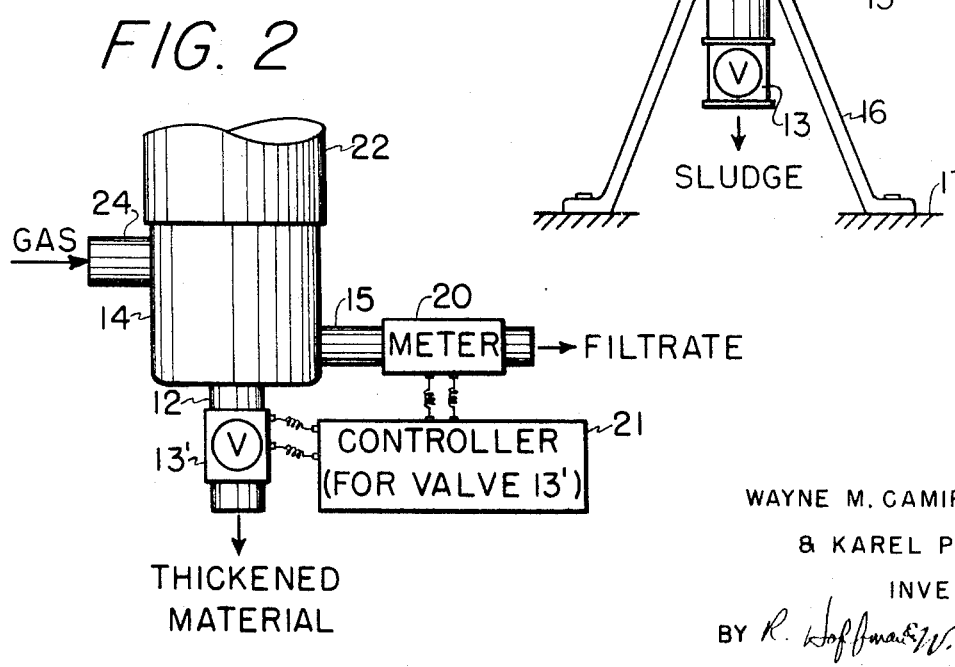

FIG. 2 is a fragmentary view illustrating a system for correlating the discharge of thickened material with the efflux of filtrate.

A particular advantage of the apparatus of the invention is that it embodies what may be termed a uniflow system of filtration; that is, the slurry to be filtered, the filtrate, and the thickened residue (filter cake) all flow in one and the same direction—downwardly. In this way the flow of each material involved in the operation complements—and even assists— the flow of the other materials. The net result is that high filtration rates are achieved and the apparatus operates successfully on slurries—such as freshly precipitated calcium, magnesium, and ferrous hydroxides—which are exceedingly difficult to handle in known filtration devices. For example, with conventional plate-and-frame filters one must precoat the filter surfaces with diatomaceous earth or other filter aid in order to be able to handle a freshly precipitated inorganic hydroxide. With the apparatus of the invention the use of filteraids in unnecessary; inorganic hydroxides can be filtered directly even if they are freshly precipitated. Contributing to the superior results obtained with our device is that solids can readily settle in the filtration chamber. Indeed, such action is enhanced by the downward movement of the incoming material to be filtered. Moreover, because of this settling action and downward movement of the incoming slurry, the filter surfaces are continuously scavenged or swept so that there is no buildup of deposits which might hinder the passage of liquid through the filter surfaces.

Another particular advantage of the apparatus is its simplicity; the device can be fabricated by any mechanic from stock items available in commerce. Also, the device may be easily moved about for use in different locations. This ready portability is particularly due to the fact that the filtration chamber is formed of a length of flexible foraminous hose and the surrounding shroud is formed of a tube of flexible plastic sheet material. When the device is to be moved, the hose and surrounding plastic shroud can be rolled up so that the whole device then takes up a small volume.

Another important feature of the invention is that the filter chamber (the flexible foraminous hose) provides an unobstructed, straight-line passageway from its inlet to its outlet. This type of construction yields significant advantages. The flow of liquids is not hampered so that the entire length of the filter chamber is available for filtration (movement of liquid through the foraminous wall of the chamber) and for downward flow of thickened slurry within the chamber. Moreover, with this type of construction, thickened slurry can be flushed out of the chamber very effectively. On the other hand, it can be readily visualized that with known devices which utilize filter chambers that are labyrinthine, convoluted, looped, or otherwise providing a devious passageway, there will necessarily be areas of restricted flow and even stagnancy with the result that deposits will build up in these areas whereby the surface available for filtration will be reduced and the system will become choked so that thickened slurry cannot be effectively flushed out of the chamber.

Contrary to many types of conventional filters, the device of the invention does not employ any vacuum-producing equipment or any vacuum-retaining compartments. Thereby the filter in accordance with the invention offers the advantages of simplicity and savings in initial and operating costs. The force for effecting the movement of liquid through the foraminous wall and for flushing out thickened material is obtained by pumping the slurry into the foraminous hose and by utilizing the head created by the column of liquid within the hose. Because of this use of a positive pressure system, there is no need for any complex rigid structural arrangement as would be required in a vacuum system; the foraminous hose is inherently capable of resisting high pressures even though made of flexible material.

Another advantage of the invention is that it provides simple and easily fabricated components for gasifying the filtrate yielded by the filter portion of the device. Accordingly, the invention is useful in various applications as for example: Carbonating cane and sugar beet juices and extracts as part of the total plan of purifying such liquids. Aerating water recovered from industrial or sanitary wastes. Such aeration is desirable to strip out dissolved noxious gases such as ammonia and hydrogen sulfide. The system of the invention can be used for deoxygenating fruit juices or other liquid foods. This is done by applying nitrogen, carbon dioxide, or other nonoxidizing gas in the gasification step whereby to strip dissolved air out of the juice. Further applications of the invention will be obvious to those skilled in the art from the foregoing illustrations.

A further advantage of the invention is that the gasification system is not only simple but also efficient. Important in this regard is an arrangement whereby the filtrate flows as a thin film down a surface (the exterior of the foraminous hose) while being contacted with the gas. Since the filtrate is in the form of a thin film, the gas can readily penetrate into it and the desired chemical and/or physical changes take place not only rapidly, but also uniformly throughout the entire volume of filtrate.

A form of apparatus in accordance with the invention is illustrated in the annexed drawing. Referring to FIG. 1, flexible hose 1 forms the filter chamber of the device. This hose has a foraminous wall so that liquid from the slurry to be filtered will pass through the wall, whereas solids will be retained within the hose. Excellent results have been attained employing, as hose 1, commercially available canvas hose sold in nursery supply houses as garden trickling hose. It is obvious, however, that other types of liquid-permeable hoses can be used such as those made from nylon, polyester fibers, polypropylene fibers, glass fibers, etc. To provide an extensive surface area for filtration and to minimize the distance that particles have to travel to reach the foraminous wall, the length of hose 1 should be at least 25 times, preferably at least 100 times, the diameter of the hose.

At its upper end, hose 1 is connected via coupling 2 to feed pipe 3. The slurry to be filtered is introduced under pressure into feed pipe by pump 4.

To support hose 1 there is provided an arrangement of: threaded rod 5 attached to feed pipe 3; turnbuckle 6; and threaded rod 7 ending in hook 8. Hook 8 is engaged with eye 9 fastened to ceiling 10, or other supporting structure.

At its lower end, hose 1 is connected to discharge pipe 12 via coupling 11.

A valve 13 is provided at the base of discharge pipe 12 for periodic (or continuous) elimination of thickened matter which accumulates in pipe 12 and in the lower portion of hose 1. Valve 13 is preferably of the type which when open provides a passageway of essentially the same cross section as that of hose 1. In this way a good sweeping-out of thickened material is attained and there is no possibility of building up any dense masses in pipe 12 or hose 1 which might impede action of the device. Taking this matter into account, as valve 13 one preferably uses a plug valve, butterfly valve, gate valve, or a valve of this iris type.

Fastened to discharge pipe 12 is cylindrical filtrate receiver 14 provided with outlet pipe 15.

To maintain the lower portion of the device in position, there are provided legs 16 which are fastened at their upper ends to receiver 14 and at their lower ends to floor 17, or other supporting structure. Best results are obtained when hose 1 is constrained so that is axis is plumb. This can easily be arranged by making sure that eye 9 is directly over the center of discharge pipe 12 and by tightening turnbuckle 6 so that hose 1 is maintained as a straight vertical column.

Positioned concentrically about hose 1 is a cylindrical shroud 22 of flexible plastic sheet material such as polyethylene, polyvinylidene chloride, nylon, rubber, or similar material which can be rolled without being cracked or otherwise damaged. The upper end of shroud 22 is cemented or otherwise fastened to collar 23 mounted on coupling 2. The lower end of shroud 22 is cemented or otherwise fastened to the upper periphery of receiver 14.

Pipes 24 and 25 are provided so that a selected gas may be passed through shroud 22. Pipe 24 may be used as the inlet for the gas, in which case the flow of gas is countercurrent to the flow of filtrate moving in the form of a thin film down the surface of hose 1. Alternatively, the gas may be fed into the system via pipe 25 whereby the gas will flow in the same direction (downwardly) as the filtrate. The gas introduced into shroud 22 may be supplied by a conventional tank of compressed gas. Where the gas is air, this may be supplied by a fan, blower, or the like which drives air from the atmosphere into pipe 24 (or pipe 25).

If desired, the apparatus may be provided with means for recirculating the gas. For example, piping and a fan or blower may be provided so that the gas exiting via pipe 25 (or pipe 24) is recirculated in whole or in part back to pipe 24 (or pipe 25). Additional fresh gas may be bled into the recirculating stream as necessary or desirable.

In operation of the device, the slurry to be filtered is pumped into the top of hose 1. To utilize the full capacity of the filter, the rate of pumping is adjusted so that hose 1 is maintained full (except at the times of periodic flushing). The liquid content of the slurry passes radially through the wall of hose 1 and then flows downwardly as a thin film along the outside of the hose, whereby it is contacted with the gas within shroud 22. The gas-treated filtrate then flows into receiver 14 and out of the system via outlet 15.

The residual (deliquefied) material remaining within hose 1 moves downwardly within the hose 1 impelled by the continued influx of slurry into the top of the hose. During the operation, valve 13 is operated at periodic intervals to slush out the thickened material which accumulates in discharge pipe 12 and the lower portion of hose 1. Alternatively, valve 13 may be maintained in a partially open position so that thickened material is discharged continuously rather than periodically.

Valve 13 may be operated manually or it may be of the solenoid type, activated by a timer or a volume-sensing mechanism programmed to open at intervals to release each time a volume of thickened material which is proportionate to the volume of entering slurry or discharging filtrate.

Reference is now made to FIG. 2 which illustrates a system for automatic discharge of thickened material. In this modification, outlet pipe 15 is provided with a volume-sensing meter 20 which programs controller 21 to open solenoid valve 13' (corresponding to valve 13 in FIG. 1) at intervals to release a predetermined amount of thickened material. For example, one may set the parameters of the system so that every time 25 gallons of filtrate are discharged through outlet 15, valve 13' is opened long enough to flush out a gallon of thickened material. In any particular case the proportions of these effluents may be varied depending on such circumstances as the solids content of the original slurry, etc.

Hereinabove it has been mentioned that best results are attained when hose 1 is maintained as a straight vertical column. When this is done the total circumference of the hose at any given level is uniformly used for filtration; there is no build up of localized masses of filter cake on any portion of the circumference. Where, however, the hose has any bends—as it may if not drawn taut—deposits of filter cake may build up on the inside of the bend (much as a river will deposit silt at stagnant areas or the inside of bends). These localized deposits will interfere with filtration and with flushing out of thickened material.

EXAMPLES

The invention is further demonstrated by the following illustrative examples, wherein parts and percentages are by weight unless otherwise specified.

The runs detailed in the examples were carried out on a filter having the structure shown in FIG. 1, wherein hose 1 was a foraminous cotton canvas hose 16 feet long and 1¼ inches in diameter, identified in the trade as grade GS-30 and normally used as a garden trickling hose. The pressures referred to below were measured at the lowest point in the filter system. Shroud 22 was a tube of polyethylene film, about 10 mils thick.

Example 1

In this run, no gas was passed through the shroud. The starting material was a slurry containing 4 percent calcium hydroxide and 96 percent tap water. This slurry was pumped into the filter at pressures varying from 12 to 20 p.s.i.g. The flow of filtrate was observed to vary with pressure, without, however, being a linear function of that variable. The flow rate at 12 p.s.i.g. was 7 gallons per minute; at 20 p.s.i.g. it was 9.5 gallons per minute. The filtrate was clear over the entire pressure range. This filtrate was, of course, an aqueous solution of calcium hydroxide.

Example 2

In this run the same slurry as before was pumped into the filter at about 12 p.s.i.g., and carbon dioxide gas was passed countercurrently through shroud 22 to partially neutralize the calcium hydroxide in the filtrate. The product received in this case was an aqueous solution having a neutral to slightly basic pH and containing mainly calcium bicarbonate in solution.

We claim:

1. Apparatus for filtering which comprises, in combination—
   A. a foraminous flexible hose, detachable means for maintaining the hose in a vertical position,
   B. means for introducing a slurry into the upper end of the hose,
   C. valve means communicating with the lower end of the hose for discharge of thickened material accumulating in the base of the hose,
   D. receptacle means mounted about the hose at the lower end thereof for receiving liquid which passes through the hose and runs downwardly along the exterior thereof, and
   E. a shroud of impervious flexible sheet material surrounding said hose but spaced therefrom, said shroud providing the means for contacting a gas with the liquid which passes through the hose and runs downwardly along the exterior thereof.

2. The apparatus of claim 1 wherein the hose has a length at least 25 times its diameter.

3. The apparatus of claim 1 wherein the hose has an essentially uniform diameter.

4. The apparatus of claim 1 wherein the hose is arranged to provide an unobstructed straight-line passageway from top to bottom thereof.

5. The apparatus of claim 1 wherein the hose is positioned with its exterior exposed to the atmosphere.

6. The apparatus of claim 1 wherein the hose is fabricated of textile material and can be rolled into a compact bundle when the apparatus is not in use.

7. The apparatus of claim 1 wherein the valve means when open provides a passageway of about the same cross section as that of the hose.

8. The apparatus of claim 1 wherein the shroud is fabricated of plastic sheet material which can be rolled up without cracking or other damage.

9. The apparatus of claim 1 wherein the hose is fabricated of textile material which can be rolled up and the shroud is fabricated of plastic sheet material which can be rolled up, whereby the hose and shroud can be rolled up together into a compact bundle when the apparatus is not in use.

10. Apparatus for filtering which comprises, in combination—
 A. a foraminous flexible hose of uniform diameter having a length at least 100 times its diameter,
 B. an inlet coupled to the top of the hose,
 C. an outlet coupled to the bottom of the hose,
 D. detachable support means cooperative with said inlet and outlet for maintaining the hose in a vertical position to provide a filter chamber having an unobstructed straight-line passageway from the inlet to the outlet,
 E. means for pumping a slurry to be filtered into the hose through the inlet,
 F. valve means communicating with the outlet for periodic discharge of thickened material accumulating in the lower portion of the hose,
 G. receptacle means mounted about the hose at the lower end thereof for receiving liquid which passes through the hose and flows downwardly along the exterior thereof, and
 H. a shroud of impervious flexible plastic sheet material surrounding said hose but spaced therefrom, said shroud providing the means for contacting a gas with the liquid which passes through the hose and runs downwardly along the exterior thereof.

11. A continuous uniflow method for filtering a slurry of a liquid and suspended solid particles denser than the liquid, and for gasifying the filtrate as it is formed, which comprises—

A. providing an elongated vertical chamber surrounded by a foraminous wall,
 B. continuously pumping the said slurry into the top of the chamber and downwardly therein whereby filtration is effected and thickened material moves downwardly within the chamber,
 C. continuously collecting the filtrate which passes through the foraminous wall and which flows downwardly along the exterior thereof,
 D. continuously metering the amount of collected filtrate,
 E. periodically releasing from the bottom of the column a portion of the liquid contained therein proportionate to the amount of filtrate collected whereby to discharge thickened material from the column, and
 F. passing a gas about the said foraminous wall to contact the gas with the liquid flowing downwardly along the exterior of said wall.

12. Apparatus for filtering which comprises, in combination—
 A. a foraminous flexible hose,
 B. means for maintaining the hose in a vertical position,
 C. means for introducing a slurry into the upper end of the hose,
 D. valve means communicating with the lower end of the hose for periodic discharge of thickened material accumulating in the base of the hose,
 E. receptacle means mounted about the hose at the lower end thereof for receiving liquid which passes through the hose and runs downwardly along the exterior thereof,
 F. control means responsive to the efflux of filtrate for actuating the valve means for periodic discharge of thickened material, and
 G. a shroud of impervious flexible sheet material surrounding said hose but spaced therefrom, said shroud providing the means for contacting a gas with the liquid which passes through the hose and runs downwardly along the exterior thereof.

13. Apparatus for filtering which comprises, in combination—
 A. a foraminous flexible hose,
 B. means for maintaining the hose in a vertical position,
 C. means for introducing a slurry into the upper end of the hose,
 D. valve means communicating with the lower end of the hose for periodic discharge of thickened material accumulating in the base of the hose,
 E. receptacle means mounted about the hose at the lower end thereof for receiving liquid which passes through the hose and runs downwardly along the exterior thereof,
 F. adjustable tensioning means for maintaining the hose in a taut condition, and
 G. a shroud of impervious flexible sheet material surrounding said hose but spaced therefrom, said shroud providing the means for contacting a gas with the liquid which passes through the hose and runs downwardly along the exterior thereof.